US008290324B2

(12) United States Patent
Sillard et al.

(10) Patent No.: US 8,290,324 B2
(45) Date of Patent: Oct. 16, 2012

(54) SINGLE-MODE OPTICAL FIBER HAVING AN ENLARGED EFFECTIVE AREA (75) Inventors: Pierre Sillard, Le Chesnay (FR); Denis Molin, Draveil (FR); Louis-Anne de Montmorillon, Versailles (FR); Marianne Bigot-Astruc, Marcoussis (FR); Simon Richard, Villebon sur Yvette (FR)

(73) Assignee: Draka Comteq, B.V., Amsterdam (NL)

( * ) Notice: Subject to any disclaimer, the term of this patent is extended or adjusted under 35 U.S.C. 154(b) by 256 days.

(21) Appl. No.: 12/694,533

(22) Filed: Jan. 27, 2010

(65) Prior Publication Data
US 2010/0189399 A1 Jul. 29, 2010

Related U.S. Application Data (60) Provisional application No. 61/147,586, filed on Jan. 27, 2009.

(30) Foreign Application Priority Data

Jan. 27, 2009 (FR) ..................... 09 00342

(51) Int. Cl.
G02B 6/036 (2006.01)
(52) U.S. Cl. ..................................... 385/126
(58) Field of Classification Search .................. None
See application file for complete search history.

(56) References Cited

U.S. PATENT DOCUMENTS

| | | |
|---|---|---|
| 4,838,643 A | 6/1989 | Hodges et al. |
| 5,574,816 A | 11/1996 | Yang et al. |
| 5,717,805 A | 2/1998 | Stulpin |
| 5,761,362 A | 6/1998 | Yang et al. |
| 5,911,023 A | 6/1999 | Risch et al. |
| 5,982,968 A | 11/1999 | Stulpin |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,483,975 B1 | 11/2002 | Hsu et al. |
| 6,493,491 B1 | 12/2002 | Shen et al. |
| 6,516,123 B1 | 2/2003 | de Montmorillon |
| 6,603,908 B2 | 8/2003 | Dallas et al. |
| 6,614,976 B2 | 9/2003 | Kato et al. |
| 6,618,538 B2 | 9/2003 | Nechitailo et al. |
| 6,658,184 B2 | 12/2003 | Bourget et al. |
| 6,658,190 B2 | 12/2003 | Hirano et al. |
| 6,749,446 B2 | 6/2004 | Nechitailo |
| 6,904,218 B2 | 6/2005 | Sun et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,076,139 B1 | 7/2006 | Aikawa et al. |
| 7,162,128 B2 | 1/2007 | Lovie et al. |
| 7,187,833 B2 * | 3/2007 | Mishra .......................... 385/127 |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 2005/0244120 A1 | 11/2005 | Mishra |
| 2008/0292262 A1 | 11/2008 | Overton et al. |
| 2008/0317410 A1 | 12/2008 | Griffioen et al. |
| 2009/0003785 A1 | 1/2009 | Parris et al. |
| 2009/0041414 A1 | 2/2009 | Lavenne et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0046899 A1 * | 2/2010 | Bickham et al. .............. 385/124 |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |

(Continued)

FOREIGN PATENT DOCUMENTS

EP 1076250 A 2/2001

(Continued)

OTHER PUBLICATIONS

French Search Report in counterpart French Application No. 09/00342, dated Sep. 18, 2009.

(Continued)

Primary Examiner — Sung Pak
(74) Attorney, Agent, or Firm — Summa, Additon & Ashe, P.A.

(57) ABSTRACT

A single-mode optical fiber includes a central core, a first inner cladding, a second inner cladding, and an outer cladding. The optical fiber, at a wavelength of 1550 nanometers, has an effective area greater than or equal to 100 $\mu m^2$. The optical fiber also has a cable cut-off wavelength less than 1260 nanometers. Additionally, the optical fiber possesses a zero chromatic dispersion wavelength of between about 1300 nanometers and 1324 nanometers and, at the zero chromatic dispersion wavelength, a dispersion slope of less than 0.092 $ps/(nm^2 \cdot km)$.

27 Claims, 1 Drawing Sheet

U.S. PATENT DOCUMENTS

| | | |
|---|---|---|
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1* | 7/2010 | Sillard et al. .................. 385/126 |
| 2010/0189400 A1* | 7/2010 | Sillard et al. .................. 385/127 |

FOREIGN PATENT DOCUMENTS

| | | |
|---|---|---|
| EP | 1255138 A | 11/2002 |
| EP | 1477831 A1 | 11/2004 |
| EP | 1921478 A1 | 5/2008 |
| EP | 1978383 A1 | 10/2008 |
| EP | 2211211 A1 | 7/2010 |
| EP | 2211212 A1 | 7/2010 |
| WO | 2009/062131 A1 | 5/2009 |

OTHER PUBLICATIONS

UIT-T, G.652 "Serie G: Systemes Et Supports De Transmission, Systemes Et Reseaux Numeriques, Caracteristiques des supports de transmission—Cables a fibres optiques", Jun. 1, 2005, pp. 8-11 [cited in French and European Search Reports].

European Search Report in counterpart European Application No. 10075028 dated Apr. 16, 2010.

French Search Report in commonly owned French Application No. 09/00343, dated Sep. 16, 2009.

European Search Report in commonly owned European Application No. 10075020 dated Apr. 16, 2010.

U.S. Appl. No. 12/098,804 for a "Transmission Optical Fiber Having Large Effective Area," Sillard et al., filed May 6, 2009.

\* cited by examiner

SINGLE-MODE OPTICAL FIBER HAVING AN ENLARGED EFFECTIVE AREA

CROSS-REFERENCE TO PRIORITY APPLICATIONS

This application claims the benefit of commonly assigned pending French application Ser. No. 09/00342 for "Fibre Optique Monomode Presentant Une Surface Effective Elargie" (filed Jan. 27, 2009, at the French Patent Office), which is hereby incorporated by reference in its entirety.

This application further claims the benefit of commonly assigned U.S. Provisional Patent Application Ser. No. 61/147,586, for "Fibre Optique Monomode Presentant Une Surface Effective Elargie" (filed Jan. 27, 2009), which is hereby incorporated by reference in its entirety.

FIELD OF THE INVENTION

The present invention relates to the field of optical fiber transmissions and, more specifically, a transmission optical fiber having an enlarged effective area.

BACKGROUND

For optical fibers, the refractive index profile is generally classified according to the appearance of the graph of the function that associates the refractive index with the radius of the optical fiber. Conventionally, the distance r to the center of the optical fiber is shown on the x-axis, and the difference between the refractive index (at radius r) and the refractive index of the optical fiber's cladding is shown on the y-axis. The refractive index profile is referred to as a "step" profile, "trapezoidal" profile, "alpha" profile, or "triangular" profile for graphs having the respective shapes of a step, a trapezoid, an alpha, or a triangle. These curves are generally representative of the theoretical or set profile of the optical fiber. Constraints in the manufacture of the optical fiber, however, may result in a slightly different actual profile.

An optical fiber conventionally includes an optical fiber core, which transmits and/or amplifies an optical signal, and an optical cladding, which confines the optical signal within the core. Accordingly, the refractive index of the core $n_c$ is typically greater than the refractive index of the cladding $n_g$ (i.e., $n_c > n_g$). The propagation of an optical signal in a single-mode optical fiber may be broken down into (i) a fundamental mode (i.e., dominant mode) in the core and (ii) secondary modes (i.e., cladding modes) guided over a certain distance in the core-cladding assembly.

Conventionally, step-index fibers, also called single-mode fibers (SMFs), are used as line fibers for optical fiber transmission systems. These optical fibers exhibit chromatic dispersion and a chromatic dispersion slope meeting specific telecommunications standards, as well as standardized cut-off wavelength and effective area values.

To facilitate compatibility between optical systems from different manufacturers, the International Telecommunication Union (ITU) defined a standard reference ITU-T G.652, with which a standard optical transmission fiber (i.e., a standard single-mode fiber or SSMF) should comply. The ITU-T G.652 recommendations and each of its attributes (i.e., A, B, C, and D) are hereby incorporated by reference.

For a transmission fiber, the G.652 standard recommends: (i) at a wavelength of 1310 nanometers, a mode field diameter (MFD or $2W_{02}$) of between about 8.6 microns and 9.5 microns with a tolerance of ±0.6 micron (i.e., a MFD of between about 8.0 microns and 10.1 microns); (ii) a cable cut-off wavelength ($\lambda_{cc}$) of 1260 nanometers or less; (iii) a zero dispersion wavelength ($\lambda_0$ or ZDW) (i.e., the chromatic dispersion coefficient) of between about 1300 and 1324 nanometers; and (iv) a chromatic dispersion slope of 0.092 ps/(nm²·km) or less at the zero dispersion wavelength. Conventionally, the cable cut-off wavelength ($\lambda_{cc}$) is measured as the wavelength at which the optical signal is no longer single mode after propagation over 22 meters of optical fiber, such as defined by subcommittee 86A of the International Electrotechnical Commission in the IEC 60793-1-44 standard, which is hereby incorporated by reference.

Increasing the effective area of a transmission fiber typically reduces its nonlinear effects. A transmission optical fiber having an enlarged effective area allows transmission over longer distances and/or increases the operating margins of the transmission system. Typically, standard single-mode fibers (SSMFs) have an effective area $A_{eff}$ of about 80 $\mu m^2$ (i.e., about 80 square-microns).

To increase the effective area of a transmission optical fiber, fiber profiles having an enlarged and flattened core compared with a SSMF have been proposed. Such an alteration in the shape of the optical fiber's core, however, typically leads to an increase in microbending losses as well as an increase in the optical fiber's effective cut-off wavelength ($\lambda_{Ceff}$) and cable cut-off wavelength ($\lambda_{cc}$). Conventionally, the effective cut-off wavelength ($\lambda_{Ceff}$) is measured as the lowest wavelength at which the optical signal is single mode after propagation over two meters of optical fiber as defined by subcommittee 86A of the International Electrotechnical Commission in the IEC 60793-1-44 standard, which, as noted, is incorporated by reference.

U.S. Pat. No. 6,658,190, which is hereby incorporated by reference, describes transmission optical fibers with an effective area enlarged to greater than 110 $\mu m^2$. These optical fibers have a wide core—1.5 to 2 times that of a SSMF—and a configuration with a constant or shallowly depressed cladding. To compensate for the increase in microbending losses caused by an increase in the effective area, this patent proposes increasing the optical-fiber diameter. Increasing the diameter of the optical fiber, however, increases manufacturing costs and leads to cabling problems because of incompatibility with other optical fibers. Additionally, this patent indicates that the cut-off wavelength decreases with the length of the optical fiber under consideration and that the optical fiber achieves a single-mode character after one kilometer of transmission. Such a measurement of the cut-off wavelength, however, does not comply with the aforementioned standardized measurements. The optical fibers described in this patent have cable cut-off wavelengths greater than 1260 nanometers and zero chromatic dispersion wavelengths $\lambda_0$ (or ZDW) of less than 1300 nanometers. The optical fibers of this patent, therefore, do not comply with the recommendations of the G.652 standard.

U.S. Pat. No. 6,516,123, which is hereby incorporated by reference, describes optical fibers having an effective area greater than 100 $\mu m^2$ at a wavelength of 1550 nanometers. The optical fibers, however, have cable cut-off wavelengths that are greater than 1260 nanometers, which is noncompliant with the G.652 standard.

U.S. Pat. No. 7,076,139, which is hereby incorporated by reference, describes an optical fiber having an effective area of 120 $\mu m^2$ at a wavelength of 1550 nanometers. This optical fiber, however, has a cable cut-off wavelength greater than 1260 nanometers and a ZDW of around 1280 nanometers, and therefore does not meet the G.652 standard.

U.S. Patent Publication No. 2005/0244120, which is hereby incorporated by reference, describes an optical fiber with an effective area of 106 µm² at a wavelength of 1550 nanometers. This optical fiber, however, has a cut-off wavelength of 1858 nanometers, which is well above the limit imposed by the G.652 standard.

European Patent No. 1,477,831, and its counterpart U.S. Pat. No. 6,904,218, each of which is hereby incorporated by reference, describe examples of optical fibers having an effective area greater than 100 µm² at a wavelength of 1550 nanometers. The example of FIG. 8 shows an optical fiber having a cut-off wavelength less than or equal to 1270 nanometers, but with a ZDW of 1295 nanometers (i.e., calculated from the fiber profile), which is outside of the G.652 standard.

U.S. Pat. No. 6,483,975, which is hereby incorporated by reference, describes an optical fiber having an effective area greater than 100 µm² at a wavelength of 1550 nanometers. The cut-off wavelength values of this optical fiber, however, are too high to meet the G.652 standard.

Commonly assigned European Patent No. 1,978,383, which is hereby incorporated by reference, describes optical fibers having an effective area greater than 120 µm², but a cut-off wavelength higher than 1260 nanometers and a zero chromatic dispersion wavelength and dispersion slope at the zero chromatic dispersion wavelength that do not meet the G.652 standard.

In brief, none of the foregoing patent documents discloses an optical fiber that possesses an effective area greater than 100 µm² at a wavelength of 1550 nanometers while meeting the constraints of the G.652 standard with respect to cable cut-off wavelength, zero chromatic dispersion wavelength, and chromatic dispersion slope at the zero dispersion wavelength.

Therefore, there is a need for a transmission optical fiber that has an expanded effective area (i.e., greater than or equal to 100 µm² at a wavelength of 1550 nanometers), and that has a cable cut-off wavelength less than or equal to 1260 nanometers, a zero chromatic dispersion wavelength of between 1300 nanometers and 1324 nanometers, and a chromatic dispersion slope at the zero chromatic dispersion wavelength less than 0.092 ps/(nm²·km). In other words, there exists a need for a single-mode optical fiber having an expanded effective area that, except for its mode field diameter, meets the ITU-T G.652 recommendations.

SUMMARY

Accordingly, in one aspect, the invention embraces an optical fiber that includes a central core, a first inner cladding, a second inner cladding, and an outer optical cladding. Typically, the central core, first inner cladding, second inner cladding, and outer optical cladding are designed to enlarge the optical fiber's effective area without adversely affecting other transmission properties.

In an exemplary embodiment, the invention embraces a single-mode optical fiber that, at a wavelength of 1550 nanometers, has an effective area greater than 100 µm². The optical fiber typically possesses a cable cut-off wavelength ($\lambda_{cc}$) of less than 1260 nanometers. The optical fiber typically has a zero chromatic dispersion wavelength of between about 1300 nanometers and 1324 nanometers and, at the zero chromatic dispersion wavelength, a chromatic dispersion slope of less than 0.092 ps/(nm²·km).

In another exemplary embodiment, the invention embraces an optical fiber having a "triple-clad" profile, which is typically used for G.653/G.655/G.656 dispersion-shifted fibers, G.654 cutoff-shifted fibers, or G.657 bend-insensitive fibers, for achieving a single-mode G.652 optical fiber. In this regard, the ITU-T G.653, G.655, and G.656 standards are hereby incorporated by reference.

In yet another exemplary embodiment, the optical fiber of the present invention includes a central core having a radius ($r_1$) of between about 4.0 microns and 5.5 microns.

In yet another exemplary embodiment, the optical fiber of the present invention includes a first inner cladding having a radius ($r_2$). The first inner cladding typically has a width ($w_2$) of between about 0.5 micron and 1.5 microns and an index difference with the outer optical cladding of between about $-2.0 \times 10^{-3}$ and $1.0 \times 10^{-3}$. Typically, the optical fiber also includes a second inner cladding (e.g., a ring) having a radius ($r_3$) and a width ($w_3$) of between about 0.9 micron and 1.6 microns. In this exemplary embodiment, the second inner cladding has a positive index difference with an outer optical cladding. In this regard, the second inner cladding (e.g., a ring) typically has an index difference (i.e., a refractive index difference) with the outer optical cladding of between about $1 \times 10^{-3}$ and $5.0 \times 10^{-3}$. In this exemplary embodiment, the central core typically has an index difference with the outer optical cladding of between about $4.2 \times 10^{-3}$ and $5.2 \times 10^{-3}$.

In yet another exemplary embodiment, the second inner cladding may be a depressed cladding having a width ($w_3$) of between about 2.5 microns and 4.5 microns and an index difference with the outer optical cladding of less than $-3.5 \times 10^{-3}$. Typically, the depressed cladding has an index difference with the outer optical cladding that is greater than $-10.0 \times 10^{-3}$. The first inner cladding typically has a width ($w_2$) of between about 7 microns and 10 microns and an index difference with the outer optical cladding of between about $-1.0 \times 10^{-3}$ and $1.0 \times 10^{-3}$. Furthermore, the central core typically has an index difference with the outer optical cladding of between about $3.5 \times 10^{-3}$ and $5.0 \times 10^{-3}$.

In another aspect, the invention embraces an optical fiber possessing an effective area that is greater than or equal to 100 µm².

In yet another exemplary embodiment, the invention embraces an optical fiber that, at a wavelength of 1625 nanometers, exhibits bending losses of less of than about 0.05 dB/100 turns (e.g., $5 \times 10^{-4}$ dB/turn) for a bend radius of 30 millimeters (i.e., radius of curvature of 30 millimeters).

In yet another exemplary embodiment, the invention embraces an optical fiber that, at a wavelength of 1550 nanometers and under similar testing conditions, exhibits microbending losses that are no more than about 100 percent greater than the microbending losses of a standard single-mode fiber (SSMF) (e.g., the ratio of the optical fiber's microbending losses to a standard single-mode fiber's microbending losses is less than or equal to 2.0). In particular, exemplary optical fibers exhibit, at a wavelength of 1550 nanometers, added loss of less than about 7 dB/km (e.g., less than about 5 dB/km) as determined via the IEC TR-62221, Method B, fixed-diameter drum test.

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect, the invention embraces a single-mode optical fiber having an enlarged effective area (e.g., 100 µm$^{-2}$ or more) that complies with many of the ITU-T G.652 recommendations.

Figure 1:
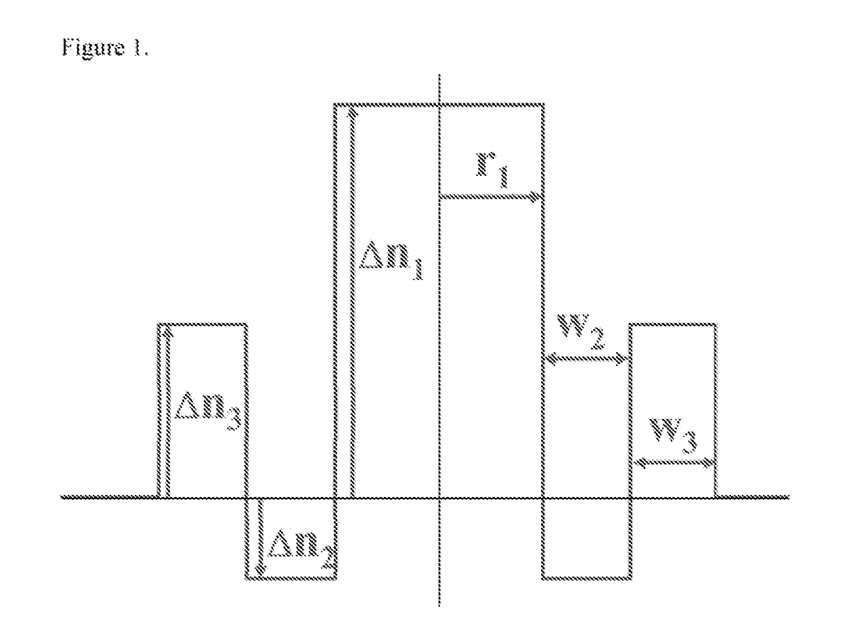
FIG. 1 schematically depicts the set profile of an exemplary embodiment of an optical fiber according to the present invention.

As depicted in FIG. 1, an exemplary optical fiber includes a central core having an index difference $\Delta n_1$ with an outer optical cladding; a first inner cladding (e.g., a first intermediate cladding) having an index difference $\Delta n_2$ with the outer optical cladding; and a second inner cladding (i.e., a ring) having a positive index difference $\Delta n_3$ with the outer optical cladding. The outer optical cladding can be made of silica.

In an exemplary embodiment, the first inner cladding ($w_2$, $r_2$, $\Delta n_2$) immediately surrounds the central core ($r_2$, $\Delta n_1$) and the ring of the second inner cladding ($w_3$, $r_3$, $\Delta n_1$) directly surrounds the first inner cladding ($w_2$, $r_2$, $\Delta n_2$). The refractive indices in the first inner cladding and in the second inner cladding are substantially constant over their respective lengths. The central core may have a step, trapezoid, triangle, or alpha index profile. The width of the central core is defined by its radius $r_1$, and the respective widths of the first inner cladding $w_2$ and of the second inner cladding $w_3$ are defined by the difference between their respective outer radii and their respective inner radii. As depicted in FIG. 1, in this exemplary embodiment in which the central core, first inner cladding, and second inner claddings are contiguous, the first inner cladding's width ($w_2$) is defined as $r_2-r_1$ (i.e., $r_2$ minus $r_1$). Similarly, the second inner cladding's width ($w_3$) is defined as $r_3-r_2$.

Those having ordinary skill in the art will appreciate that it is within the scope of the present invention for one or more other cladding layers to be present between the optical fiber's central core and the first inner cladding ($r_2$, $\Delta n_2$). Similarly, one or more cladding layers may be present between the first inner cladding ($r_2$, $\Delta n_2$) and the second inner cladding ($r_3$, $\Delta n_3$). Accordingly, those having ordinary skill in the art will appreciate that the width of a particular cladding layer is defined by the difference between that cladding layer's outer radius and its inner radius (i.e., $r_{outer}-r_{inner}$).

Typically, the central core, the first inner cladding, and the second inner cladding are obtained by CVD-type deposition in a silica tube and the outer cladding is produced by refilling the tube (e.g., using natural or doped silica). In some exemplary embodiments, the outer optical cladding is obtained by another deposition technique (e.g., VAD or OVD).

In an exemplary embodiment, the optical fiber's central core has a radius $r_1$ of between about 4.0 microns and 5.5 microns and an index difference $\Delta n_1$ of between about 4.2× 10$^{-3}$ and 5.2×10$^{-3}$ as compared with the outer optical cladding. Typically, the radius $r_1$ is large enough to facilitate an increase in the optical fiber's effective area, but the radius $r_1$ is also small enough to obtain a cable cut-off wavelength of less than about 1260 nanometers.

Typically, the first inner cladding of the optical fiber of this exemplary embodiment has a width $w_2$ of between about 0.5 micron and 1.5 microns. The first inner cladding typically has an index difference $\Delta n_2$ with the outer optical cladding of between about -2×10$^{-3}$ and 1.0×10$^{-3}$. Typically, the width $w_2$ of the first inner cladding is small enough to achieve, at a wavelength of 1550 nanometers, an effective area greater than or equal to about 100 µm$^2$.

Typically, the second inner cladding (e.g., a ring) of this exemplary embodiment has a width $w_3$ of between about 0.9 micron and 1.6 microns. The ring typically has a positive index difference $\Delta n_3$ with the outer optical cladding of between about 1.0×10$^{-3}$ and 5.0×10$^{-3}$. Typically, the width $w_3$ of the second inner cladding is small enough to achieve (i) a cable cut-off wavelength less than or equal to 1260 nanometers, (ii) a zero chromatic dispersion wavelength of between about 1300 nanometers and 1324 nanometers, and (iii) a chromatic dispersion slope at the zero chromatic dispersion wavelength of less than about 0.092 ps/(nm$^2$·km).

Table I (below) characterizes the index profiles of five exemplary optical fibers (e.g., prophetic examples) and two comparative optical fibers. The first column provides a reference for each profile. The three following columns provide the radius value of the core ($r_1$) and the widths of each inner cladding ($w_2$ and $w_3$). The last three columns provide the values of the respective index differences (i.e., refractive index differences) for the core ($\Delta n_1$) and cladding layers ($\Delta n_2$ and $\Delta n_3$). The refractive index values are measured at a wavelength of 633 nanometers. The exemplary optical fibers of Table I have an outer diameter of 125 microns with a tolerance of ±1 micron.

The values in Table I correspond to the set profiles of the optical fibers. As previously discussed, manufactured optical fibers typically possess refractive index profiles that deviate slightly from their set profiles (i.e., the theoretical refractive-index profiles).

TABLE I

| Fibers | $r_1$ (µm) | $w_2$ (µm) | $w_3$ (µm) | $\Delta n_1$ (×10$^{-3}$) @633 nm | $\Delta n_2$ (×10$^{-3}$) @633 nm | $\Delta n_3$ (×10$^{-3}$) @633 nm |
|---|---|---|---|---|---|---|
| 1 | 4.51 | 1.10 | 1.22 | 4.7 | 0.4 | 2.4 |
| 2 | 4.37 | 0.61 | 1.44 | 4.8 | -0.7 | 2.9 |
| 3 | 4.50 | 0.65 | 1.39 | 4.7 | -1.1 | 3.0 |
| 4 | 4.40 | 0.91 | 1.27 | 4.7 | 0.2 | 3.0 |
| 5 | 4.87 | 1.01 | 1.14 | 4.5 | -1.2 | 3.0 |
| U.S. Pat. No. 6,516,123 | 5.00 | 1.20 | 2.00 | 4.9 | -2.9 | 3.2 |
| U.S. Pat. No. 7,076,139 | 7.75 | 18.60 | 4.65 | 4.1 | -0.7 | 1.9 |

Table II (below) provides the optical properties of the exemplary optical fibers and comparative optical fibers of Table I. In Table II, the first column repeats the references of Table I. The following columns provide, for each fiber profile, the values of cable cut-off wavelength ($\lambda_{cc}$); mode field diameter $2W_{02}$ at 1310 nanometers; effective area ($A_{eff}$) at 1550 nanometers; chromatic dispersion (D) at 1550 nanometers; chromatic dispersion slope (P) at 1550 nanometers; zero chromatic dispersion wavelength (ZDW); and chromatic dispersion slope ($P_{ZDW}$) at zero chromatic dispersion wavelength.

TABLE II

| Fibers | $\lambda_{CC}$ (nm) | $2W_{02}$ @1310 nm (μm) | $A_{eff}$ @1550 nm (μm²) | D @1550 nm (ps/(nm · km)) | P @1550 nm (ps/(nm² · km)) | ZDW (nm) | $P_{ZDW}$ @ZDW (ps/(nm² · km)) |
|---|---|---|---|---|---|---|---|
| 1 | 1260 | 10.1 | 100 | 17.5 | 0.062 | 1310 | 0.090 |
| 2 | 1260 | 10.2 | 101 | 17.6 | 0.062 | 1310 | 0.090 |
| 3 | 1260 | 10.4 | 105 | 17.6 | 0.062 | 1310 | 0.090 |
| 4 | 1260 | 10.3 | 104 | 17.6 | 0.062 | 1310 | 0.090 |
| 5 | 1250 | 10.4 | 106 | 17.5 | 0.062 | 1310 | 0.090 |
| U.S. Pat. No. 6,516,123 | >1350 | 10.0 | 100 | 17.4 | 0.062 | 1310 | 0.086 |
| U.S. Pat. No. 7,076,139 | >1400 | 12.6 | 156 | 21.2 | 0.064 | <1290 | >0.095 |

Table II shows that for the five exemplary optical fibers the effective area ($A_{eff}$) at a wavelength of 1550 nanometers is greater than or equal to 100 μm². Furthermore, four of the exemplary optical fibers have an effective area ($A_{eff}$) greater than 100 μm². At 1310 nanometers, the mode field diameter ($2W_{02}$) is greater than 9.5 microns for each of the optical fibers. In this regard, none of the exemplary optical fibers complies with the G.652 recommendations with respect to mode field diameter. As a practical matter, however, a mode field diameter ($2W_{02}$) at 1310 nanometers that is outside of the G.652 standard may not be detrimental, because most current optical systems no longer operate at a wavelength of 1310 nanometers.

Table II also indicates that each of the exemplary optical fibers (Fibers 1-5) possesses a cable cut-off wavelength ($\lambda_{cc}$) that is less than or equal to 1260 nanometers, a zero chromatic dispersion wavelength (ZDW) of between about 1300 nanometers and 1324 nanometers, and a chromatic dispersion slope ($P_{ZDW}$) at the zero chromatic dispersion wavelength that is less than 0.092 ps/(nm²·km). Thus, the five exemplary optical fibers meet the G.652 standard's recommendations with respect to cable cut-off wavelength, zero chromatic dispersion wavelength, and chromatic dispersion slope at the zero chromatic dispersion wavelength.

In this regard, optical fiber according to this exemplary embodiment has an effective area greater than or equal to 100 μm², yet, except for mode field diameter, achieves optical parameters meeting the G.652 recommendations.

By way of observation and without being bound to any theory, the limits of the comparative optical fibers are described in connection with the parameters (shown in bold) in Tables I and II. The optical fiber described in U.S. Pat. No. 6,516,123 possesses a cable cut-off wavelength that is greater than 1260 nanometers, because the width $w_3$ of the second inner cladding is too large. Similarly, the optical fiber described in U.S. Pat. No. 7,076,139 possesses a cable cut-off wavelength that is greater than 1260 nanometers because the width $w_3$ of the second inner cladding is too large. Additionally, the optical fiber described in U.S. Pat. No. 7,076,139 possesses a zero chromatic dispersion wavelength that is less than 1300 nanometers and a chromatic dispersion slope at the zero chromatic dispersion wavelength that is greater than 0.092 ps/(nm²·km) because the core width $r_1$ and the first inner cladding width $w_2$ are too large.

\*\*\*

Figure 2:
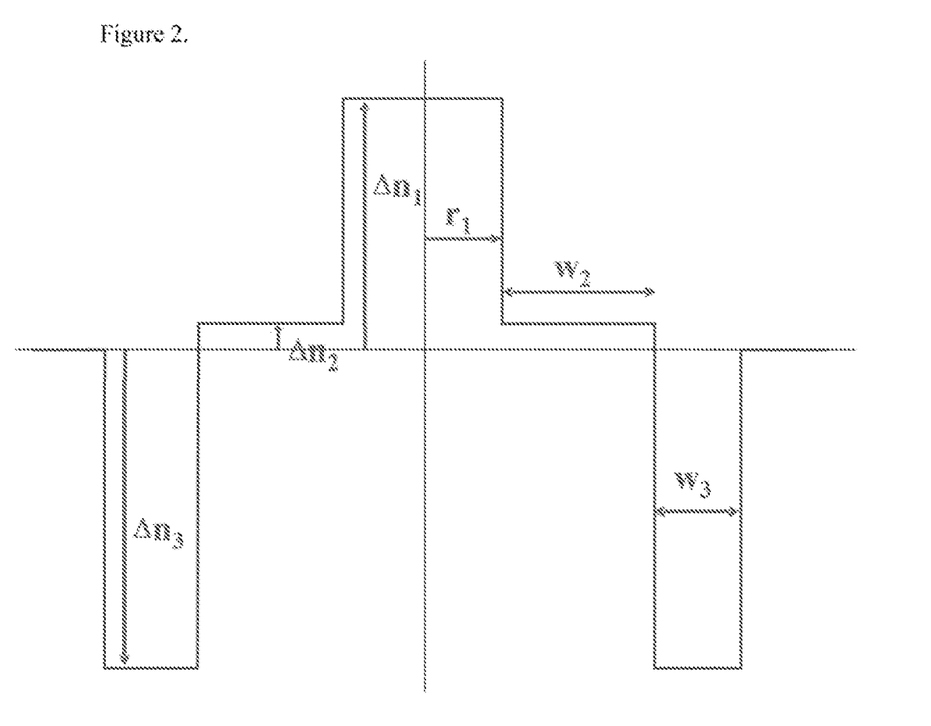
FIG. 2 schematically depicts the set profile of another exemplary embodiment of an optical fiber according to the present invention.

FIG. 2 schematically depicts the set profile of another exemplary embodiment of an optical fiber according to the present invention. In this exemplary embodiment, the optical fiber includes a central core having an index difference $\Delta n_1$ with an outer cladding (e.g., an outer optical cladding). Typically, the optical fiber also includes a first inner cladding (e.g., an intermediate cladding) having an index difference $\Delta n_2$ with the outer optical cladding. The optical fiber typically also includes a second inner cladding (i.e., a depressed cladding) having a negative index difference $\Delta n_3$ with the outer optical cladding. As before, the outer optical cladding can be made of silica.

In some exemplary embodiments, the first inner cladding ($w_2$, $r_2$, $\Delta n_2$) directly surrounds the central core ($r_1$, $\Delta n_1$) and the depressed cladding ($w_3$, $r_3$, $\Delta n_a$) directly surrounds the first inner cladding ($w_2$, $\Delta n_2$). The respective refractive indices of the first inner cladding and the second inner cladding are substantially constant over their respective lengths. The central core may have a step, trapezoid, triangle or alpha index profile. The width of the central core is defined by its radius $r_1$, and the respective widths of the first inner cladding $w_2$ and of the depressed cladding $w_3$ are defined by the difference between their respective outer radii and their respective inner radii. As shown in FIG. 2, the first inner cladding's width $w_2$ is defined by $r_2-r_1$ (i.e., $r_2$ minus $r_1$), while the depressed cladding's width $w_3$ is defined by $r_3-r_2$.

As noted previously, it is within the scope of the present invention for one or more other cladding layers to be present between the optical fiber's central core and the first inner cladding ($r_2$, $\Delta n_2$). Similarly, one or more cladding layers may be present between the first inner cladding ($r_2$, $\Delta n_2$) and the second inner cladding ($r_3$, $\Delta n_3$). Moreover, those having ordinary skill in the art will appreciate that, as before, the width of a particular cladding layer is defined by the difference between that cladding layer's outer radius and its inner radius (i.e., $r_{outer}-r_{inner}$).

In an exemplary embodiment, the optical fiber's central core has a radius $r_1$ of between about 4.0 microns and 5.5 microns and an index difference $\Delta n_1$ of between about $3.5 \times 10^{-3}$ and $5.0 \times 10^{-3}$ as compared with the outer optical cladding. Typically, the central core's radius $r_1$ is large enough to achieve an effective area greater than or equal to 100 μcm², but is also small enough to achieve a cable cut-off wavelength of less than about 1260 nanometers.

Typically, the first inner cladding of the optical fiber according to this exemplary embodiment has a width $w_2$ of between about 7.0 microns and 10.0 microns. The first inner cladding typically has an index difference $\Delta n_2$ with the outer optical cladding of between about $-1.0 \times 10^{-3}$ and $1.0 \times 10^{-3}$. The width $w_2$ of the first inner cladding is typically large enough to achieve a zero chromatic dispersion wavelength greater than 1300 nanometers, and a chromatic dispersion slope at the zero chromatic dispersion wavelength of less than 0.092 ps/(nm²·km).

Furthermore, the optical fiber's second inner cladding (e.g., the depressed cladding) typically has a width $w_3$ of between about 2.5 microns and 4.5 microns. Typically, the second inner cladding has an index difference $\Delta n_3$ with the outer optical cladding (i.e., a depth as depicted in a refractive index profile) of less than $-3.5 \times 10^{-3}$ (e.g., between about $-3.5 \times 10^{-3}$ and $-10 \times 10^{-3}$). In this regard, the depressed cladding's width and depth are small enough and large enough, respectively, to achieve a cable cut-off wavelength of less than or equal to 1260 nanometers, a zero chromatic dispersion wavelength of between about 1300 nanometers and 1324 nanometers, and a chromatic dispersion slope at the zero chromatic dispersion wavelength of less than 0.092 ps/(nm²·km).

Table III (below) characterizes the index profiles of four exemplary optical fibers (e.g., prophetic examples) and three comparative optical fibers. The first column provides a reference to each profile. The three following columns provide the radius values for the core ($r_2$) and the widths of the cladding layers ($w_2$ and $w_3$). The last three columns provide the values of the index differences (i.e., refractive index differences) for the core ($\Delta n_2$) and cladding layers ($\Delta n_2$ and $\Delta n_3$). The index values are measured at a wavelength of 633 nanometers. The exemplary optical fibers of Table III have an outer diameter of 125 microns, with a tolerance of ±1 micron.

The values in Table III correspond to set profiles of the optical fibers. As previously discussed, manufactured optical fibers typically possess refractive index profiles that deviate slightly from their set profiles (i.e., the theoretical refractive-index profiles).

TABLE III

| Fibers | $r_1$ (μm) | $w_2$ (μm) | $w_3$ (μm) | $\Delta n_1$ (×10⁻³) @633 nm | $\Delta n_2$ (×10⁻³) @633 nm | $\Delta n_3$ (×10⁻³) @633 nm |
|---|---|---|---|---|---|---|
| 1 | 4.75 | 8.08 | 3.17 | 4.1 | 0.1 | −6.0 |
| 2 | 4.76 | 7.80 | 3.44 | 4.0 | 0.2 | −6.0 |
| 3 | 4.77 | 7.31 | 3.92 | 3.9 | 0.3 | −6.0 |
| 4 | 4.71 | 7.23 | 3.06 | 4.2 | 0.3 | −6.0 |
| European Patent No. 1,978,383 | 6.04 | 5.23 | 4.73 | 4.3 | 0.0 | −4.7 |
| U.S. Patent Pub. No. 2005/0244120 | 7.10 | 5.20 | 12.80 | 4.6 | 0.0 | −2.9 |
| European Patent No. 1,477,831 | 6.00 | 10.00 | 18.00 | 4.0 | −0.3 | −1.3 |

Table IV (below) provides the optical properties of the exemplary optical fibers and comparative optical fibers of Table III. In Table IV, the first column repeats the references of Table III. The following columns provide, for each fiber profile, the values of cable cut-off wavelength ($\lambda_{cc}$); mode field diameter ($2W_{02}$) at 1310 nanometers; effective area ($A_{eff}$) at a wavelength of 1550 nanometers; chromatic dispersion (D) at 1550 nanometers; and chromatic dispersion slope (P) at 1550 nanometers; the zero chromatic dispersion wavelength (ZDW); and chromatic dispersion slope ($P_{ZDW}$) at zero chromatic dispersion wavelength.

TABLE IV

| Fibers | $\lambda_{CC}$ (nm) | $2W_{02}$ @1310 nm (μm) | $A_{eff}$ @1550 nm (μm²) | D @1550 nm (ps/(nm·km)) | P @1550 nm (ps/(nm²·km)) | ZDW (nm) | $P_{ZDW}$ @ZDW (ps/(nm²·km)) |
|---|---|---|---|---|---|---|---|
| 1 | 1190 | 10.2 | 102 | 17.9 | 0.063 | 1310 | 0.090 |
| 2 | 1190 | 10.3 | 104 | 18.0 | 0.063 | 1310 | 0.090 |
| 3 | 1200 | 10.6 | 108 | 18.3 | 0.064 | 1305 | 0.091 |
| 4 | 1200 | 10.3 | 103 | 18.1 | 0.064 | 1310 | 0.090 |
| European Patent No. 1,978,383 | >1400 | 11.3 | 122 | 20.5 | 0.064 | <1290 | >0.095 |
| U.S. Patent Pub. No. 2005/0244120 | 1858 | 10.5 | 106 | 19.2 | 0.064 | 1301 | 0.092 |
| European Patent No. 1,477,831 | ≦1270 | 10.8 | 110 | 18.6 | 0.061 | <1300 | 0.092 |

IV shows that for the four exemplary optical fibers the effective area ($A_{eff}$) at a wavelength of 1550 nanometers is greater than or equal to 100 μm². In fact, at 1550 nanometers, all four exemplary optical fibers have effective areas ($A_{eff}$) that are greater than 100 μm². The mode field diameter ($2W_{02}$) at 1310 nanometers is greater than 9.5 microns. In this regard, none of the exemplary optical fibers complies with the G.652 standard with respect to mode field diameter. As noted, however, a mode field diameter ($2W_{02}$) at 1310 nanometers that is outside of the G.652 standard may not be detrimental, because most current optical systems no longer operate at a wavelength of 1310 nanometers.

Table IV also indicates that each of the exemplary optical fibers (Fibers 1-4) possesses a cable cut-off wavelength ($\lambda_{cc}$) that is less than or equal to 1260 nanometers, a zero chromatic dispersion wavelength (ZDW) that is between 1300 nanometers and 1324 nanometers, and a chromatic dispersion slope ($P_{ZDW}$) at the zero chromatic dispersion wavelength that is less than 0.092 ps/(nm$^2$·km). Thus, the four exemplary optical fibers meet the G.652 standard's recommendations on cable cut-off wavelength, zero chromatic dispersion wavelength, and chromatic dispersion slope at the zero chromatic dispersion wavelength.

In this regard, the optical fiber according to this exemplary embodiment possesses an effective area greater than or equal to 100 µm$^2$, yet, except for mode field diameter, achieves optical parameters meeting the G.652 recommendations.

By way of observation and without being bound to any theory, the limitations of the comparative optical fibers are described in connection with the parameters shown in bold in Tables III and IV. In the optical fiber described in European Patent No. 1,978,383, the cable cut-off wavelength is greater than 1260 nanometers, the zero chromatic dispersion wavelength is less than 1300 nanometers, and the chromatic dispersion slope at the zero chromatic dispersion wavelength is greater than 0.092 ps/(nm$^2$·km), because the radius $r_1$ of the core is too large and the width $w_2$ of the first inner cladding is too small. In the optical fiber described in U.S. patent Publication No. 2005/0244120, the cable cut-off wavelength is greater than 1260 nanometers, because the radius $r_1$ of the core, the width $w_3$, and the index difference $\Delta n_3$ of the second inner cladding are all too large. Finally, in the optical fiber described in European Patent No. 1,477,831, the zero chromatic dispersion wavelength is less than 1300 nanometers, because the second inner cladding is very wide and shallow (i.e., the width $w_3$ of the second inner cladding is too large and the index difference $\Delta n_3$ of the second inner cladding is too small).

\*\*\*

Exemplary embodiments of an optical fiber according to the present invention have bending losses that are less than 0.05 dB/100 turns for a radius of 30 millimeters at a wavelength of 1625 nanometers. These macrobending loss values are approximately equivalent to those of standard optical fibers.

Moreover, the exemplary optical fibers exhibit microbending losses (i.e., when subjected to identical constraints) such that the ratio of each exemplary optical fiber's microbending losses to the SSMF's microbending losses is less than or equal to 2 (e.g., less than 1.5). Those having ordinary skill in the art will recognize that an exemplary single-mode optical fiber has a simple step-index profile and meets all of the ITU-T G.652 recommendations.

In particular, exemplary optical fibers exhibit, at a wavelength of 1550 nanometers, added loss of less than about 7 dB/km (e.g., less than about 5 dB/km) using the IEC TR-62221, Method B, fixed-diameter drum test. In this regard and by way of comparison, a standard single-mode optical fiber (SSMF) typically exhibits added loss of between about 1 dB/km and 3 dB/km.

The microbending losses can be measured, for example, by the fixed diameter drum method. The fixed diameter drum method is described in the technical recommendation of the IEC subcommittee 86A under the reference IEC TR-62221 (e.g., Method B) and is hereby incorporated by reference.

The IEC TR62221 microbending-sensitivity technical report (e.g., IEC TR62221, Method B, Ed. 1) and standard test procedures measure added loss using a fixed-diameter sandpaper drum procedure. The IEC fixed-diameter sandpaper drum test (i.e., IEC TR62221, Method B) provides a microbending stress situation that affects single-mode fibers even at room temperature.

In accordance with IEC TR62221, Method B, initial attenuation is measured on a sample of optical fiber wound on a shipping spool. The sandpaper provides a rough surface that subjects the optical fiber to thousands, if not millions, of stress points. A fiber spool with a minimum diameter of 200 millimeters is wrapped with adhesive-backed, 40-micron grade sandpaper (i.e., approximately equivalent to 300-grit sandpaper) to create a rough surface. Then, fiber samples of at least 400 meters are wound at about 3 N (i.e., a tension of about 300 gf on a 300-mm diameter cylinder), and attenuation is measured at 23° C. Added loss due to microbending stresses is calculated as the difference between the initial attenuation measurement and the attenuation measurement when the optical fiber is on the sandpaper drum. For the sake of convenience, this particular implementation of the IEC TR62221, Method B, is herein referred to as the "Fixed-Diameter Sandpaper-Drum Test."

The macrobending losses of the fiber during the Fixed-Diameter Sandpaper-Drum Test are typically negligible. As such, the measured added loss is attributed to microbending effects.

The optical fiber according to the invention is particularly suited for long-distance transmission systems. Increasing the effective area, without significantly degrading the other optical parameters of the optical fiber, facilitates an increase in the power of the optical signals transmitted without increasing the nonlinear effects. In this regard, the signal-to-noise ratio of the transmission line is improved, which is particularly desirable in land-based or underwater long-distance optical transmission systems.

Optical fibers according to the invention typically possess an effective area that is greater than the effective area of a standard single-mode optical fiber (SSMF). Additionally, optical fibers according to the invention typically comply with the recommendations of the ITU-T G.652 standard, except for the recommendations with respect to mode field diameter ($2W_{02}$) at a wavelength of 1310 nanometers. Accordingly, optical fibers according to the invention exhibit good compatibility with other single-mode optical fibers when installed in transmission systems.

\*\*\*

The present fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (µm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns) and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments the primary coating layer may have an outer diameter of between about 135 microns and about 175 microns (e.g., about 160 microns), typically less than 165 microns (e.g., between about 135 microns and 150 microns) and usually more than 140 microns (e.g., between about 145 microns and 155 microns, such as about 150 microns).

Moreover, in such exemplary embodiments the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter may be worthwhile for some optical-fiber applications.

As noted, the present optical fiber may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fiber may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation) it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished in one direction, helically, known as "S" or "Z" stranding, or Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). Likewise, strength members can be included within the buffer tube's casing.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or, within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Patent Application Publication No. US2009/0003785 A1 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape along with one or more dielectric jackets may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Patent Application Publication No. US2008/0317410 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. (Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the fiber ends either in the field (e.g., at the network location) or in a factory prior to installation into the network. The ends of the connectors are mated in the field in order to connect the fibers together or connect the fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound with a bending radius of less than about 15 millimeters (e.g., 10 millimeters or less, such as about millimeters) in the optical module or the storage box.

Moreover, present optical fibers may be used in other applications, including, without limitation, fiber optic sensors or illumination applications (e.g., lighting).

\*\*\*

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the fiber, thereby increasing the fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or tilted pattern), or (iii) a narrow UV light beam for creating individual variations. The FBG structure may have, for example, a uniform positive-only index change, a Gaussian-apodized index change, a raised-cosine-apodized index change, or a discrete phase shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

\*\*\*

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); U.S. patent application Ser. No. 12/617,316 for an Amplifying Optical Fiber and Method of Manufacturing, filed Nov. 12, 2009, (Pastouret et al.) U.S. patent application Ser. No. 12/629,495 for an Amplifying Optical Fiber and Production Method, filed Dec. 2, 2009, (Pastouret et al.); U.S. patent application Ser. No. 12/633,229 for an Ionizing Radiation-Resistant Optical Fiber Amplifier, filed Dec. 8, 2009, (Regnier et al.); U.S. patent application Ser. No. 12/636,277 for a Buffered Optical Fiber, filed Dec. 11, 2009, (Testu et al.); U.S. patent application Ser. No. 12/683,775 for a Method of Classifying a Graded-Index Multimode Optical Fiber, filed Jan. 7, 2010, (Gholami et al.); and U.S. patent application Ser. No. 12/692,161 for a Single-Mode Optical fiber, filed Jan. 22, 2010, (Richard et al.);

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber Drop Cables for MDU Deployments, filed Nov. 9, 2009, (Overton); U.S. patent application Ser. No. 12/614,754 for Optical-Fiber Loose Tube Cables, filed Nov. 9, 2009, (Overton); U.S. patent application Ser. No. 12/615,003 for a Reduced-Size Flat Drop Cable, filed Nov. 9, 2009, (Overton et al.); U.S. patent application Ser. No. 12/615,106 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); U.S. patent application Ser. No. 12/615,737 for a Reduced-Diameter, Easy-Access Loose Tube Cable, filed Nov. 10, 2009, (Overton); U.S. patent application Ser. No. 12/642,784 for a Method and Device for Manufacturing an Optical Preform, filed Dec. 19, 2009, (Milicevic et al.); U.S. patent application Ser. No. 12/648,794 for a Perforated Water-Blocking Element, filed Dec. 29, 2009, (Parris); and U.S. patent application Ser. No. 12/649,758 for a UVLED Apparatus for Curing Glass-Fiber Coatings, filed Dec. 30, 2009, (Hartsuiker et al.).

\*\*\*

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:
1. A single-mode optical fiber, comprising:
a central core having a radius ($r_1$) and a positive index difference ($\Delta n_1$) with an outer optical cladding;
a first inner cladding having a radius ($r_2$), a width ($w_2$), and an index difference ($\Delta_2$) with the outer optical cladding;
a second inner cladding having a radius ($r_3$), a width ($w_3$), and an index difference ($\Delta n_3$) with the outer optical cladding;
wherein the optical fiber has a cable cut-off wavelength of 1260 nanometers or less;
wherein the optical fiber has a zero chromatic dispersion wavelength of between 1300 nanometers and 1324 nanometers;
wherein, at the zero chromatic dispersion wavelength, the optical fiber has a chromatic dispersion slope of 0.092 ps/(nm$^2$·km) or less; and
wherein, at a wavelength of 1550 nanometers, the optical fiber has an effective area of at least about 100 µm$^2$.

2. The optical fiber according to claim 1, wherein the central core has a radius ($r_1$) of between about 4.0 microns and 5.5 microns.

3. The optical fiber according to claim 1, wherein the second inner cladding has a positive index difference ($\Delta n_3$) with the outer optical cladding.

4. The optical fiber according to claim 3, wherein the central core has an index difference ($\Delta n_1$) with the outer optical cladding of between about $4.2 \times 10^{-3}$ and $5.2 \times 10^{-3}$.

5. The optical fiber according to claim 3, wherein the first inner cladding has a width ($w_2$) of between about 0.5 micron and 1.5 microns.

6. The optical fiber according to claim 3, wherein the first inner cladding has an index difference ($\Delta n_2$) with the outer optical cladding of between about $-2.0 \times 10^{-3}$ and $1.0 \times 10^{-3}$.

7. The optical fiber according to claim 3, wherein the second inner cladding has a width ($w_3$) of between about 0.9 micron and 1.6 microns.

8. The optical fiber according to claim 3, wherein the second inner cladding has an index difference ($\Delta n_3$) with the outer optical cladding of between about $1 \times 10^{-3}$ and $5.0 \times 10^{-3}$.

9. The optical fiber according to claim 1, wherein the second inner cladding has a negative index difference ($\Delta n_3$) with the outer optical cladding.

10. The optical fiber according to claim 9, wherein the central core has an index difference ($\Delta n_1$) with the outer optical cladding of between about $3.5 \times 10^{-3}$ and $5.0 \times 10^{-3}$.

11. The optical fiber according to claim 9, wherein the first inner cladding has a width ($w_2$) of between about 7 microns and 10 microns.

12. The optical fiber according to claim 9, wherein the first inner cladding has an index difference ($\Delta n_2$) with the outer optical cladding of between about $-1.0 \times 10^{-3}$ and $1.0 \times 10^{-3}$.

13. The optical fiber according to claim 9, wherein the second inner cladding has a width ($w_3$) of between about 2.5 microns and 4.5 microns.

14. The optical fiber according to claim 9, wherein the second inner cladding has an index difference ($\Delta n_3$) with the outer optical cladding of $-3.5 \times 10^{-3}$ or less.

15. The optical fiber according to claim 9, wherein the second inner cladding has an index difference ($\Delta n_3$) with the outer optical cladding of about $-10.0 \times 10^{-3}$ or more.

16. The optical fiber according to claim 1, wherein, at a wavelength of 1625 nanometers, the optical fiber exhibits bending losses of 0.05 dB/100 turns or less for a radius of curvature of 30 millimeters.

17. The optical fiber according to claim 1, wherein, at a wavelength of 1550 nanometers, the optical fiber exhibits microbending losses such that the ratio of the optical fiber's microbending losses to a standard single-mode fiber's microbending losses subjected to identical testing conditions is less than about two.

18. An optical fiber according to claim 1, wherein, at a wavelength of 1550 nanometers, the optical fiber exhibits added loss of less than 7 dB/km as measured at 23° C. in accordance with the IEC TR62221, Method B ("Fixed-Diameter Sandpaper-Drum Test").

19. A cable containing one or more optical fibers according to claim 1.

20. A single-mode optical fiber, comprising:
a central core positioned within an outer optical cladding, the central core having a radius ($r_1$) and a refractive index difference ($\Delta n_1$) with the outer optical cladding;
a first inner cladding immediately surrounding the central core and positioned within the outer optical cladding, the first inner cladding having a radius ($r_2$), a width ($w_2$), and a refractive index difference ($\Delta n_2$) with the outer optical cladding;
a second inner cladding immediately surrounding the first inner cladding and positioned within the outer optical cladding, the second inner cladding having a radius ($r_3$), a width ($w_3$) and a positive refractive index difference ($\Delta n_3$) with the outer optical cladding;
wherein the optical fiber has a cable cut-off wavelength of 1260 nanometers or less;
wherein the optical fiber has a zero chromatic dispersion wavelength of between about 1300 nanometers and 1324 nanometers;
wherein, at the zero chromatic dispersion wavelength, the optical fiber has a chromatic dispersion slope of about 0.092 ps/(nm$^2$·km) or less; and
wherein, at a wavelength of 1550 nanometers, the optical fiber has an effective area of at least about 100 µm$^2$.

21. The optical fiber according to claim 20, wherein the central core has (i) a radius ($r_1$) of between about 4.0 microns and 5.5 microns and (ii) a refractive index difference ($\Delta n_1$) with the outer optical cladding of between about $4.2 \times 10^{-3}$ and $5.2 \times 10^{-3}$.

22. The optical fiber according to claim 20, wherein the first inner cladding has (i) a width ($w_2$) of between about 0.5 micron and 1.5 microns and (ii) a refractive index difference ($\Delta n_2$) with the outer optical cladding of between about $-2.0 \times 10^{-3}$ and $1.0 \times 10^{-3}$.

23. The optical fiber according to claim 20, wherein the second inner cladding has (i) a width ($w_3$) of between about 0.9 micron and 1.6 microns and (ii) a refractive index difference ($\Delta n_3$) with the outer optical cladding of between about $1 \times 10^{-3}$ and $5.0 \times 10^{-3}$.

24. A single-mode optical fiber, comprising:
a central core positioned within an outer optical cladding, the central core having a radius ($r_1$) and a refractive index difference ($\Delta n_1$) with the outer optical cladding;
a first inner cladding immediately surrounding the central core and positioned within the outer optical cladding, the first inner cladding having a radius ($r_2$), a width ($w_2$), and a refractive index difference ($\Delta n_2$) with the outer optical cladding;
a second inner cladding immediately surrounding the first inner cladding and positioned within the outer optical cladding, the second inner cladding having a radius ($r_3$), a width ($w_3$) and a negative refractive index difference ($\Delta n_3$) with the outer optical cladding;

wherein the optical fiber has a cable cut-off wavelength of 1260 nanometers or less;

wherein the optical fiber has a zero chromatic dispersion wavelength of between about 1300 nanometers and 1324 nanometers;

wherein, at the zero chromatic dispersion wavelength, the optical fiber has a chromatic dispersion slope of about 0.092 ps/(nm²·km) or less; and wherein, at a wavelength of 1550 nanometers, the optical fiber has an effective area of at least about 100 μcm².

25. The optical fiber according to claim 24, wherein the central core has (i) a radius ($r_1$) of between about 4.0 microns and 5.5 microns and (ii) a refractive index difference ($\Delta n_1$) with the outer optical cladding of between about $3.5 \times 10^{-3}$ and $5.0 \times 10^{-3}$.

26. The optical fiber according to claim 24, wherein the first inner cladding has (i) a width ($w_2$) of between about 7 microns and 10 microns and (ii) a refractive index difference ($\Delta n_2$) with the outer optical cladding of between about $-1.0 \times 10^{-3}$ and $1.0 \times 10^{-3}$.

27. The optical fiber according to claim 24, wherein the second inner cladding has (i) a width ($w_3$) of between about 2.5 microns and 4.5 microns and (ii) a refractive index difference ($\Delta n_3$) with the outer optical cladding of between about $-10.0 \times 10^{-3}$ and $-3.5 \times 10^{-3}$.

* * * * *